United States Patent
Habib et al.

(10) Patent No.: US 9,996,227 B2
(45) Date of Patent: *Jun. 12, 2018

(54) APPARATUS AND METHOD FOR DIGITAL CONTENT NAVIGATION

(71) Applicant: INTEL CORPORATION, Santa Clara, CA (US)

(72) Inventors: Babur Habib, San Francisco, CA (US); Osman Rashid, Fremont, CA (US); Bradley S. Hochberg, San Jose, CA (US); Kyrie Robinson, Palo Alto, CA (US); Ann Sydeman, Woodside, CA (US); Paul S. Chambers, San Jose, CA (US); Mohnish Rao, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/702,025

(22) Filed: May 1, 2015

(65) Prior Publication Data

US 2015/0378535 A1    Dec. 31, 2015

Related U.S. Application Data

(63) Continuation of application No. 13/117,080, filed on May 26, 2011, now Pat. No. 9,037,991.
(Continued)

(51) Int. Cl.
*G06F 3/0483* (2013.01)
*G06F 1/16* (2006.01)
(Continued)

(52) U.S. Cl.
CPC .......... *G06F 3/0483* (2013.01); *G06F 1/1616* (2013.01); *G06F 1/1643* (2013.01);
(Continued)

(58) Field of Classification Search
CPC .... G06F 3/0483; G06F 3/0482; G06F 3/0484; G06F 3/0488
See application file for complete search history.

(56) References Cited

U.S. PATENT DOCUMENTS

| 3,132,911 A | 5/1964 | Heidler |
| 4,163,303 A | 8/1979 | Hanna |

(Continued)

OTHER PUBLICATIONS

Office Action dated Jun. 6, 2014 for U.S. Appl. No. 12/964,660, 15 pages.
(Continued)

*Primary Examiner* — David E Choi
(74) *Attorney, Agent, or Firm* — Schwabe, Williamson & Wyatt, P.C.

(57) ABSTRACT

An electronic device includes a processor, a memory for storing digital content and a display. The processor forms a content navigation bar for the digital content. The content navigation bar is rendered on the display and includes a first section marker corresponding to a first section of the digital content. A set of page markers corresponds to pages within the first section of the digital content. The set of page markers includes a boundary page marker. A second section marker is adjacent to the boundary page marker.

23 Claims, 3 Drawing Sheets

Related U.S. Application Data

(60) Provisional application No. 61/396,789, filed on Jun. 1, 2010.

(51) Int. Cl.
  *G06F 3/0488* (2013.01)
  *G06F 3/0482* (2013.01)
  *G06F 3/0484* (2013.01)

(52) U.S. Cl.
  CPC .......... *G06F 1/1647* (2013.01); *G06F 3/0482* (2013.01); *G06F 3/0488* (2013.01); *G06F 3/04842* (2013.01); *G06F 3/04883* (2013.01)

(56) References Cited

U.S. PATENT DOCUMENTS

| | | | |
|---|---|---|---|
| 4,619,304 A | 10/1986 | Smith | |
| 4,633,436 A | 12/1986 | Flurry | |
| 4,821,373 A | 4/1989 | Maidment et al. | |
| 5,355,555 A | 10/1994 | Zarelius | |
| 5,410,779 A | 5/1995 | Esman et al. | |
| 5,461,581 A | 10/1995 | Hallwirth et al. | |
| 5,610,825 A | 3/1997 | Johnson et al. | |
| 5,714,971 A * | 2/1998 | Shalit ................ | G06F 3/0481 715/792 |
| 5,819,032 A | 10/1998 | de Vries et al. | |
| 5,870,552 A | 2/1999 | Dozier | |
| 5,870,559 A | 2/1999 | Leshem et al. | |
| 5,893,899 A | 4/1999 | Johnson et al. | |
| 5,920,864 A | 7/1999 | Zhao | |
| 5,958,008 A | 9/1999 | Pogrebisky et al. | |
| 5,987,704 A | 11/1999 | Tang | |
| 6,037,937 A * | 3/2000 | Beaton ................ | G06F 3/0485 715/764 |
| 6,094,197 A | 7/2000 | Buxton et al. | |
| 6,138,072 A | 10/2000 | Nagai | |
| 6,144,962 A | 11/2000 | Weinberg et al. | |
| 6,157,381 A * | 12/2000 | Bates ................ | G06F 3/04855 345/684 |
| 6,168,341 B1 | 1/2001 | Chene et al. | |
| 6,237,006 B1 | 5/2001 | Weinberg et al. | |
| 6,288,704 B1 * | 9/2001 | Flack ................ | G06F 1/1626 345/156 |
| 6,292,188 B1 * | 9/2001 | Carlson ................ | G06F 3/0482 707/E17.111 |
| 6,377,249 B1 | 4/2002 | Mumford | |
| 6,411,302 B1 | 6/2002 | Chiraz | |
| 6,466,220 B1 | 10/2002 | Cesana et al. | |
| 6,537,103 B2 | 3/2003 | Jamison | |
| 6,647,145 B1 | 11/2003 | Gay | |
| 7,032,187 B2 | 4/2006 | Keely et al. | |
| 7,100,119 B2 | 8/2006 | Keely et al. | |
| 7,158,678 B2 | 1/2007 | Nagel et al. | |
| 7,167,585 B2 | 1/2007 | Gounares et al. | |
| 7,251,413 B2 | 7/2007 | Dow et al. | |
| 7,425,103 B2 | 9/2008 | Perez-Sanchez | |
| 7,427,984 B2 | 9/2008 | Smirnov et al. | |
| 7,450,114 B2 * | 11/2008 | Anwar ................ | G06F 3/1203 178/18.01 |
| 7,477,205 B1 | 1/2009 | de Waal et al. | |
| 7,480,858 B2 * | 1/2009 | Chen ................ | G06F 17/30905 707/E17.121 |
| 7,576,730 B2 * | 8/2009 | Anwar ................ | G06F 3/0481 345/156 |
| 7,689,928 B1 | 3/2010 | Gilra | |
| 7,735,104 B2 | 6/2010 | Dow et al. | |
| 7,757,184 B2 * | 7/2010 | Martin ................ | G06F 3/0482 715/765 |
| 7,774,358 B2 | 8/2010 | Tamas et al. | |
| 7,873,243 B2 | 1/2011 | Cohen et al. | |
| 7,886,233 B2 | 2/2011 | Rainisto et al. | |
| 7,889,186 B2 | 2/2011 | Nishimura et al. | |
| 8,140,560 B2 | 3/2012 | Dinn | |
| 8,155,498 B2 | 4/2012 | Dow et al. | |
| 8,200,796 B1 | 6/2012 | Margulis | |
| 8,340,476 B2 | 12/2012 | Cohen et al. | |
| 8,407,606 B1 | 3/2013 | Davidson et al. | |
| 8,479,480 B2 | 7/2013 | Dias et al. | |
| 8,510,677 B2 * | 8/2013 | van Os ................ | G06F 3/0483 715/833 |
| 8,576,222 B2 | 11/2013 | Hadley et al. | |
| 8,599,174 B2 | 12/2013 | Cohen et al. | |
| 2001/0005207 A1 | 6/2001 | Muikaichi et al. | |
| 2002/0011990 A1 * | 1/2002 | Anwar ................ | G06F 3/1203 345/173 |
| 2002/0024506 A1 * | 2/2002 | Flack ................ | G06F 1/1626 345/169 |
| 2002/0067319 A1 | 6/2002 | Hensel | |
| 2002/0080195 A1 * | 6/2002 | Carlson ................ | G06F 3/0482 715/853 |
| 2002/0109668 A1 | 8/2002 | Rosenberg et al. | |
| 2002/0113823 A1 * | 8/2002 | Card ................ | G06F 3/04815 715/776 |
| 2002/0133906 A1 | 9/2002 | Fedon | |
| 2003/0030852 A1 | 2/2003 | Sampson et al. | |
| 2003/0202772 A1 | 10/2003 | Dow et al. | |
| 2003/0202773 A1 | 10/2003 | Dow et al. | |
| 2003/0214491 A1 | 11/2003 | Keely et al. | |
| 2004/0080498 A1 | 4/2004 | Fujiwara et al. | |
| 2004/0194014 A1 * | 9/2004 | Anwar ................ | G06F 3/0481 715/276 |
| 2004/0221311 A1 | 11/2004 | Dow et al. | |
| 2004/0257369 A1 | 12/2004 | Fang | |
| 2005/0010871 A1 * | 1/2005 | Ruthfield ............... | G06F 3/0481 715/712 |
| 2005/0051350 A1 | 3/2005 | Porter et al. | |
| 2005/0052427 A1 * | 3/2005 | Wu ................ | G06F 3/04883 345/173 |
| 2005/0078098 A1 | 4/2005 | Dresevic et al. | |
| 2005/0079477 A1 * | 4/2005 | Diesel ................ | G06F 17/30902 434/350 |
| 2005/0079747 A1 | 4/2005 | Diesel et al. | |
| 2005/0162413 A1 | 7/2005 | Dresevic et al. | |
| 2005/0183031 A1 * | 8/2005 | Onslow ................ | G06F 3/0481 715/805 |
| 2006/0028457 A1 | 2/2006 | Burns | |
| 2006/0061551 A1 * | 3/2006 | Fateh ................ | G06F 1/1626 345/158 |
| 2006/0152496 A1 | 7/2006 | Knaven | |
| 2006/0159345 A1 | 7/2006 | Clary et al. | |
| 2006/0184901 A1 * | 8/2006 | Dietz ................ | G06F 3/04855 715/855 |
| 2006/0239505 A1 | 10/2006 | Bjorklund et al. | |
| 2006/0244738 A1 | 11/2006 | Nishimura et al. | |
| 2006/0253493 A1 | 11/2006 | Tamas et al. | |
| 2006/0256139 A1 | 11/2006 | Gikandi | |
| 2006/0274086 A1 * | 12/2006 | Forstall ................ | G06F 9/543 345/629 |
| 2006/0277460 A1 * | 12/2006 | Forstall ............... | G06F 17/30905 715/234 |
| 2006/0284851 A1 | 12/2006 | Pittman | |
| 2006/0294466 A1 * | 12/2006 | Muller ................ | G06F 3/0482 715/719 |
| 2007/0061707 A1 * | 3/2007 | Sally ................ | G06F 17/3089 715/210 |
| 2007/0094267 A1 * | 4/2007 | Good ................ | G06F 17/30873 |
| 2007/0132763 A1 | 6/2007 | Chu et al. | |
| 2007/0180397 A1 | 8/2007 | Hoyer et al. | |
| 2007/0180471 A1 * | 8/2007 | Unz ................ | G06F 17/3089 725/52 |
| 2007/0247445 A1 | 10/2007 | Lynggaard et al. | |
| 2007/0256031 A1 * | 11/2007 | Martin ................ | G06F 3/0482 715/854 |
| 2007/0291401 A1 | 12/2007 | Syeda-Mahmood et al. | |
| 2008/0076472 A1 | 3/2008 | Hyatt | |
| 2008/0078055 A1 | 4/2008 | Estlander | |
| 2008/0150946 A1 | 6/2008 | Kuo | |
| 2008/0165255 A1 * | 7/2008 | Christie ................ | G06F 3/04883 348/207.99 |
| 2008/0180409 A1 | 7/2008 | Matsuda | |
| 2008/0243808 A1 | 10/2008 | Reiman et al. | |

(56) References Cited

U.S. PATENT DOCUMENTS

| | | | |
|---|---|---|---|
| 2008/0296074 A1 | 12/2008 | Hollstron et al. | |
| 2009/0015793 A1 | 1/2009 | Suzuki et al. | |
| 2009/0021493 A1 | 1/2009 | Marggraff et al. | |
| 2009/0044236 A1 | 2/2009 | Bendiabdallah et al. | |
| 2009/0063960 A1* | 3/2009 | Anwar | G06F 3/1203 715/255 |
| 2009/0083618 A1* | 3/2009 | Campbell | G06F 17/243 715/226 |
| 2009/0083655 A1 | 3/2009 | Beharie et al. | |
| 2009/0100380 A1* | 4/2009 | Gardner | G06F 3/0483 715/854 |
| 2009/0161958 A1 | 6/2009 | Markiewicz et al. | |
| 2009/0184972 A1 | 7/2009 | Weybrew et al. | |
| 2009/0198132 A1 | 8/2009 | Pelissier et al. | |
| 2009/0199122 A1 | 8/2009 | Albertson et al. | |
| 2009/0204663 A1* | 8/2009 | Patwari | H04N 7/17318 709/203 |
| 2009/0213085 A1 | 8/2009 | Zhen et al. | |
| 2009/0324082 A1 | 12/2009 | Liu et al. | |
| 2010/0077059 A1 | 3/2010 | Shen | |
| 2010/0077343 A1* | 3/2010 | Uhl | G06F 3/0483 715/787 |
| 2010/0097331 A1 | 4/2010 | Wu | |
| 2010/0104269 A1 | 4/2010 | Prestenback et al. | |
| 2010/0115452 A1* | 5/2010 | Chabot | G06F 17/30899 715/779 |
| 2010/0138767 A1* | 6/2010 | Wang | G06F 3/0481 715/769 |
| 2010/0138875 A1 | 6/2010 | Johnson et al. | |
| 2010/0161653 A1 | 6/2010 | Krasnow | |
| 2010/0017704 A1 | 7/2010 | Brenneman et al. | |
| 2010/0175018 A1* | 7/2010 | Petschnigg | G06F 3/0483 715/776 |
| 2010/0177047 A1* | 7/2010 | Brenneman | G06F 1/1616 345/173 |
| 2010/0185948 A1* | 7/2010 | Anwar | G06F 3/1203 715/702 |
| 2010/0185975 A1* | 7/2010 | Anwar | G06F 3/1203 715/781 |
| 2010/0192062 A1* | 7/2010 | Anwar | G06F 3/1203 715/702 |
| 2010/0210332 A1 | 8/2010 | Imai | |
| 2010/0211866 A1* | 8/2010 | Nicholas | G06F 17/212 715/234 |
| 2010/0245295 A1 | 9/2010 | Kimpara | |
| 2010/0259494 A1 | 10/2010 | Kii | |
| 2010/0278504 A1 | 11/2010 | Lyons et al. | |
| 2010/0281372 A1* | 11/2010 | Lyons | G11B 27/034 715/720 |
| 2010/0281384 A1* | 11/2010 | Lyons | G06F 3/048 715/723 |
| 2010/0289820 A1 | 11/2010 | Hoyer et al. | |
| 2010/0309131 A1 | 12/2010 | Clary | |
| 2010/0315266 A1 | 12/2010 | Gunawardana et al. | |
| 2011/0018821 A1 | 1/2011 | Kii | |
| 2011/0066965 A1* | 3/2011 | Choi | G06F 17/30014 715/776 |
| 2011/0090155 A1 | 4/2011 | Caskey et al. | |
| 2011/0122081 A1 | 5/2011 | Kushler | |
| 2011/0145724 A1* | 6/2011 | Tsai | G06F 1/1647 715/748 |
| 2011/0148892 A1 | 6/2011 | Shreiner et al. | |
| 2011/0167369 A1* | 7/2011 | van Os | G06F 3/0483 715/769 |
| 2011/0185318 A1 | 7/2011 | Hinckley et al. | |
| 2011/0191719 A1 | 8/2011 | Hinckley et al. | |
| 2011/0199297 A1 | 8/2011 | Antonyuk et al. | |
| 2011/0202856 A1 | 8/2011 | Handley et al. | |
| 2011/0209058 A1* | 8/2011 | Hinckley | G06F 3/04883 715/702 |
| 2011/0261060 A1 | 10/2011 | Waibel et al. | |
| 2011/0289444 A1* | 11/2011 | Winsky | G06F 1/1616 715/776 |
| 2011/0292042 A1 | 12/2011 | Vaganov | |
| 2011/0296344 A1* | 12/2011 | Habib | G06F 1/1616 715/810 |
| 2011/0320950 A1* | 12/2011 | Rajput | G06F 17/30743 715/728 |
| 2012/0023433 A1 | 1/2012 | Choi et al. | |
| 2012/0032886 A1 | 2/2012 | Ciesla et al. | |
| 2012/0036468 A1 | 2/2012 | Colley | |
| 2012/0090135 A1 | 4/2012 | Soh | |
| 2012/0144283 A1 | 6/2012 | Hill et al. | |

OTHER PUBLICATIONS

Final Office Action dated Oct. 17, 2014 for U.S. Appl. No. 12/964,660, 15 pages.
Office Action dated Nov. 19, 2012 for U.S. Appl. No. 13/117,080, 21 pages.
Final Office Action dated Mar. 5, 2013 for U.S. Appl. No. 13/117,080, 21 pages.
Office Action dated Dec. 19, 2013 for U.S. Appl. No. 13/117,080, 23 pages.
Final Office Action dated Apr. 2, 2014 for U.S. Appl. No. 13/117,080, 20 pages.
Advisory Action dated Jun. 3, 2014 for U.S. Appl. No. 13/117,080, 3 pages.
Office Action dated Apr. 15, 2013 for U.S. Appl. No. 13/117,087, 11 pages.
Final Office Action dated Aug. 2, 2013 for U.S. Appl. No. 13/117,087, 11 pages.
Office Action dated Aug. 5, 2014 for U.S. Appl. No. 13/117,087, 10 pages.
Final Office Action dated Nov. 26, 2014 for U.S. Appl. No. 13/117,087, 9 pages.
Office Action dated Aug. 22, 2012 for U.S. Appl. No. 13/149,868, 10 pages.
Final Office Action dated Jan. 15, 2013 for U.S. Appl. No. 13/149,868, 12 pages.
Office Action dated Jun. 6, 2013 for U.S. Appl. No. 13/149,868, 16 pages.
Final Office Action dated Jan. 9, 2014 for U.S. Appl. No. 13/149,868, 21 pages.
Office Action dated Aug. 13, 2014 for U.S. Appl. No. 13/149,868, 12 pages.
Final Office Action dated Mar. 6, 2015 for U.S. Appl. No. 13/149,868, 42 pages.
Advisory Action dated Apr. 21, 2015 for U.S. Appl. No. 13/149,868, 5 pages.
Office Action dated Dec. 28, 2012 for U.S. Appl. No. 13/149,887, 9 pages.
Final Office Action dated May 22, 2013 for U.S. Appl. No. 13/149,887, 11 pages.
Song Ho Ahn, "OpenGL Frame Buffer Object (FBO)", 2008, http://wayback.archive.org/web/20080822025141/http://ww.songho.ca/opengl/gl_fbo_html.
Microsoft Word—Split Function, retrieved on Mar. 23, 2014, http://learnthat.com/2010//02/microsoft-word-2007-tutorial/7/, 5 pages.

* cited by examiner

APPARATUS AND METHOD FOR DIGITAL CONTENT NAVIGATION

CROSS-REFERENCE TO RELATED APPLICATION

This present application is a continuation of and claims priority under 35 U.S.C. § 120 to U.S. patent application Ser. No. 13/117,080 filed May 26, 2011, entitled "APPARATUS AND METHOD FOR DIGITAL CONTENT NAVIGATION", which claims priority to Provisional Patent Application 61/396,789 filed Jun. 1, 2010, entitled "ELECTRONIC DEVICE FOR EDUCATION", the contents of each of which are incorporated herein by reference.

FIELD OF THE INVENTION

This invention relates generally to electronic devices. More particularly, the invention relates to digital content navigation in an electronic device.

BACKGROUND OF THE INVENTION

Since more and more reading content is consumed on electronic devices, there is a growing need for efficient navigation of digital content. Conventional scroll bar navigation techniques do not allow for efficient scanning of information or rapid access of particular portions of lengthy documents.

Accordingly, it is desirable to provide new navigation techniques for digital content.

SUMMARY OF THE INVENTION

An electronic device includes a processor, a memory for storing digital content and a display. The processor forms a content navigation bar for the digital content. The content navigation bar is rendered on the display and includes a first section marker corresponding to a first section of the digital content. A set of page markers corresponds to pages within the first section of the digital content. The set of page markers includes a boundary page marker. A second section marker is adjacent to the boundary page marker.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention relates to systems and methods for navigating digital content. Although the invention will work equally well for other electronic media, for the purpose of discussion, the example of an electronic book is described. Typically, an electronic book has several sections. One section, for example, could be all of the pages that precede the table of contents (TOC). The TOC itself can be another section. The chapters, index, glossary and any appendices can be sectioned in the same way. Upon loading the electronic book, the sections are segmented and given markers in a content navigation bar. Markers are also given to each of the pages in a section.

Figure 1:
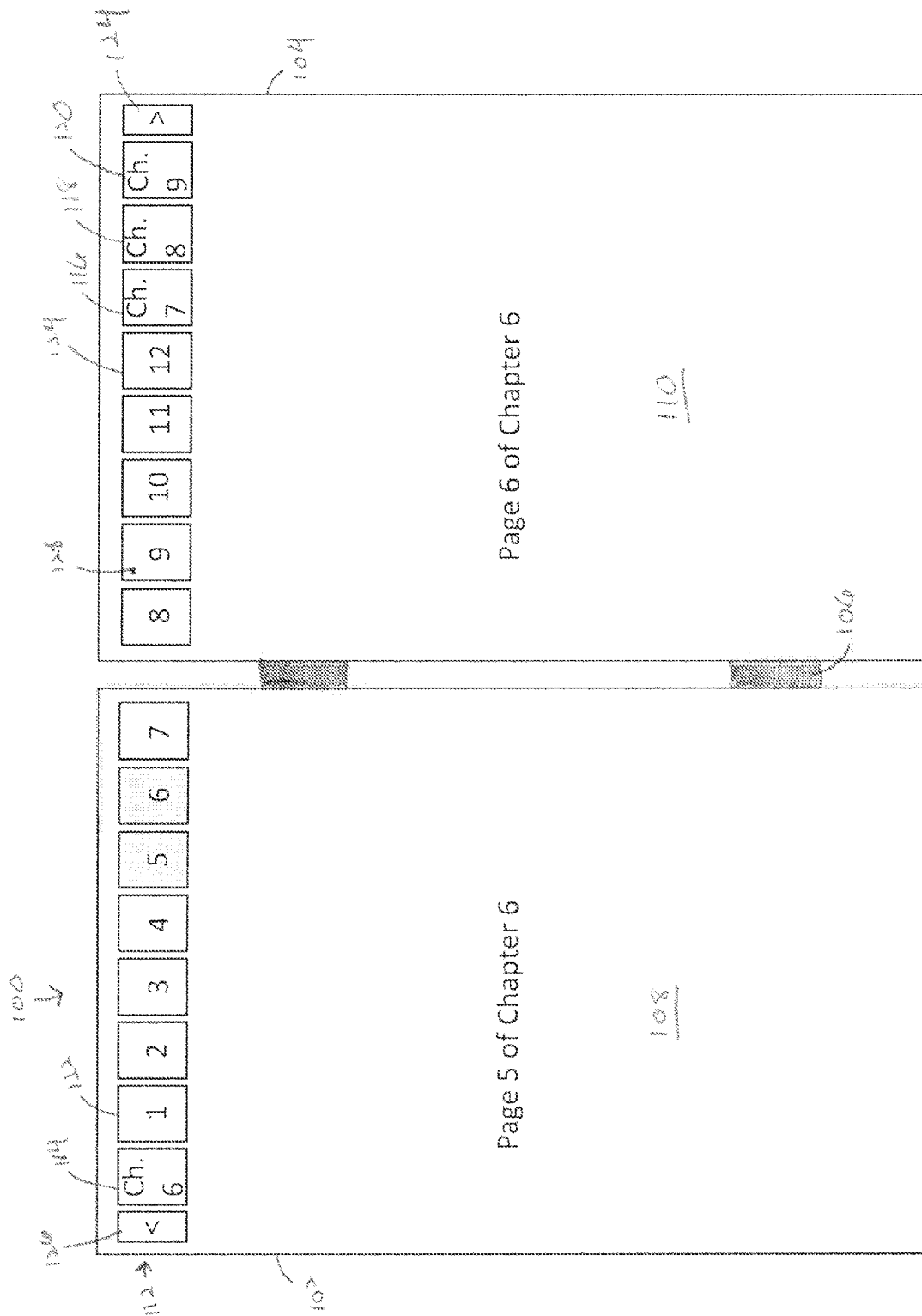
FIG. 1 illustrates a content navigation bar configured in accordance with an embodiment of the invention.

FIG. 1 illustrates an electronic device 100 with a first touch screen 102 and a second touch screen 104. The screens are attached by at least one hinge 106. In this example, the first touch screen 102 display a page 108, while the second touch screen 104 displays another page 110.

A content navigation bar 112 is displayed across the first touch screen 102 and the second touch screen 104. The content navigation bar 112 includes section markers 114, 116, 118 and 120. In addition, the content navigation bar 112 includes individual page markers, such as page marker 122 and boundary page marker 124. The boundary page marker 124 may be the last page in a section or simply represent a boundary to another section of content.

In FIG. 1, the content navigation bare 112 resides near the top of the display screens and is displayed horizontally, but other locations and orientations are possible.

Each section marker may include a label that characterizes the content that it represents, e.g. Table of Contents, Chapter 4, Appendix B, etc. The page markers are included sequentially in the content navigation bar after a section marker. When the number of sections plus number of pages in the current section is greater than the number that can be conveniently displayed, only a subset of the page markers is shown. For example, in FIG. 1. the electronic content displayed is page 5 and 6 of Chapter 6 and the content navigation bar shows page markers for Chapter 6, and section markers for Chapter 7, Chapter 8 and Chapter 9. Preferably, the page markers for page 5 and page 6 of Chapter 6 are visually different from the other markers to indicate the currently displayed digital content.

The portion of the content navigation bar that is not visible can be accessed or displayed in different ways. As the displayed page is changed, for example by page turning, or by accessing a different page though a bookmark or hyperlink, or by selecting a location from the currently displayed portion of the content navigation bar, or by any other means, the displayed markers are updated based on the location of the displayed page. Using a drag or flick gesture to scroll the content navigation bar forwards or backwards can also vary the portion of the content navigation bar that is displayed. In this situation, the displayed pages may not be visible on the navigation control element.

In another embodiment, the current section is expanded such that individual page markers are displayed, starting with the first page of the chapter. When a page in a new chapter is reached, the content navigation bar closes the old chapter (i.e., no longer displays the page markers) and expands the new chapter (i.e., displays page markers for pages in the new chapter). In the case of nested organization levels, each level can be given its own section and corresponding title for use in the content navigation bar.

The content navigation bar provides easy identification of pages without being unduly long. Where a chapter has a large number of pages, a sub-set of pages may be displayed. Alternately, the content navigation bar can be configured to be responsive to gestures, such as drag or flick operations that provide a rapid update of the page markers. In response to a drag or flick operation, content slides according to the speed of the drag or flick.

Control element such as arrows 124 and 126 can be employed for scrolling operations to the left or right. In addition, touching, dragging or a flick action on the content navigation bar can be used to scroll across content. In this manner, the content navigation bar can be easily used to select particular pages. For example, a gesture such as a tap on one of the page markers can be used to select that page to display or tapping on one of the section markers navigates the reader to the first page in the section.

In another aspect of the invention, other commands can be used to obtain more detailed information from the content navigation bar. For example, contact for longer than a predetermined threshold (as opposed to a tap) on a section marker can expand a separate section magnifier (or chapter preview) that shows thumbnails of each of the pages in that section. For example, an extended press of the section maker 114 (or some other applied gesture) invokes the thumbnail panel 130, which includes individual thumbnail representations of pages 132A, 132B, 132C, etc. in chapter 6. A swiping gesture applied to the thumbnail panel 130 results in new pages from the chapter being displayed. Naturally, the thumb nail panel 130 may appear on the first touch screen 102 and/or the second touch screen 104.

Icons or indicators on the thumbnails can be used to indicate features of that page (for example bookmarks, writing, sticky notes, highlighting, a web link etc.). The thumbnails can also include icons that indicate which types of modifications have been made to the page. Tapping on one of the thumbnails can change the display to that page and close the chapter magnifier.

Preferably, the current page (or pages) is highlighted or given a distinguishing feature such that the current page(s) can be easily identified in the content navigation bar. The markers can also indicate whether a particular page has been bookmarked, for example by displaying a bookmark symbol 128 in the upper left corner of the marker. It can be appreciated that other page distinguishing features (such as if the page has highlighting, a web link, a sticky note etc.) can also be indicated on the marker.

Figure 2:
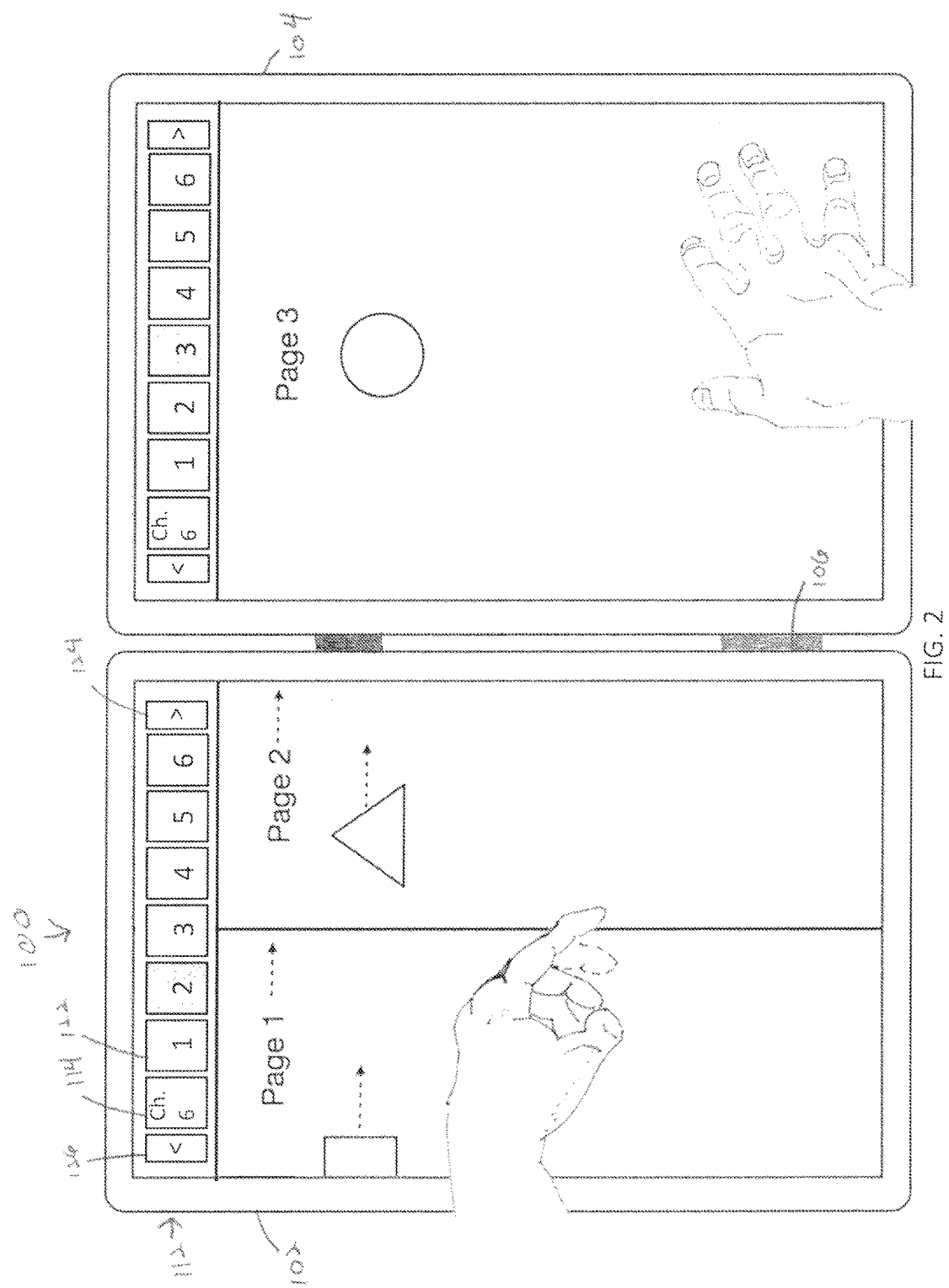
FIG. 2 illustrates a content navigation bar configured in accordance with an alternate embodiment of the invention.

Another aspect of the present invention for a dual display device is the ability to hold a particular page on one screen while browsing though different pages of the electronic content on the opposite screen. As shown in FIG. 2, this could be activated by a multi-finger hold on one panel 102 plus a drag or flick on the opposite panel 104. In this case, the content control bar 112 will automatically split into two components that can be operated independently for each display.

In another aspect of the invention, as the two panels go into single page mode for page turning, a tag or other indication appears on the page marker in each of the two displayed pages. As the pages are moved, the tag moves to the current page. Tapping on the tag on either panel returns the display to two-page mode with the pages correctly ordered. The panel on which the tag was tapped is kept and the other panel is updated to the appropriate page such that the two pages in the display are in the correct consecutive order from left to right. Once this operation of holding one page and turning the other occurs, the two panels continue to operate independently.

This ability to have a split navigation control element allows one to hyperlink to content either within or external to the current electronic content. For example, items in the table of contents are linked to the corresponding page in the book, page numbers in the index are linked to those pages, words appearing in a glossary are linked to the glossary entry, and URLs in the text are linked to a browser external to the current electronic content. When in the hold and turn mode, and the held page has hyperlinks to other locations in the book, tapping on the hyperlinks can navigate the opposite page to that location. A gesture such as a multi-finger hold on the opposite panel can indicate that the link should be displayed on the held page.

Another aspect of the invention is that bookmarks can be added on any page and can be labeled by either typing or writing with a stylus or other device. The bookmarks are then indicated in the content navigation bar and can also be accessed from a separate bookmark menu (and accessed for example by tapping a bookmark icon). Tapping on the bookmark from the list or on the content navigation bar updates the display to the page with the bookmark. In addition to these user added bookmarks, upon loading particular segments or chapters can be added to the bookmark list. For example, the table of contents, index and glossary can be automatically added to the bookmark list.

Figure 3:
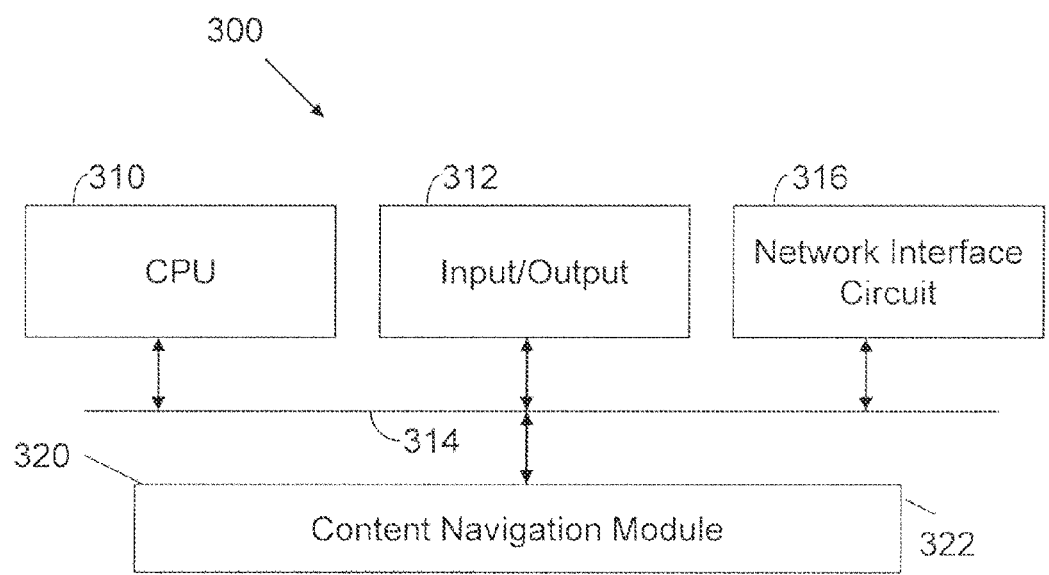
FIG. 3 illustrates an electronic device that may be utilized in accordance with an embodiment of the invention.

FIG. 3 illustrates an electronic device 300 configured in accordance with an embodiment of the invention. The electronic device 300 includes a processor 310 connected to a set of input/output devices 312 via a bus 314. In one embodiment, the input/output devices 312 include at least two touch screens. In addition, the input/output devices 312 may include a keyboard, mouse, speaker, printer and the like. A network interface circuit 316 is also connected to the bus 314 so that the electronic device 300 may operate in a networked environment. A memory 320 is also connected to the bus. The memory 320 includes executable instructions to implement operations of the invention. For example, a content navigation module 322 includes executable instructions to implement operations described throughout this specification and accompanying figures.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An electronic device, comprising:
a processor;
a memory for storing digital content; and
a display,
wherein the processor is to:
generate and render a first instance of a user interface, the first instance of the user interface comprising a first content navigation bar for selection of the digital content to be rendered within the display,
generate and render, in response to a detected user input, a second instance of the user interface, the second instance of the user interface comprising:
the first content navigation bar and a first selected page rendered on a first portion of the display, wherein the first content navigation bar comprises section markers and page markers, wherein the first selected page is to be rendered within the first portion of the display in response to a first gesture applied to a selected page marker of the first content navigation bar on the first portion of the display, and
a second content navigation bar rendered on a second portion of the display, wherein the second content navigation bar comprises section markers and page markers, wherein a second selected page is to be rendered within the second portion of the display in response to a second gesture applied to a selected page marker of the second content navigation bar on the second portion of the display,
wherein, in the second instance of the user interface, the first content navigation bar is to operate independent of the second content navigation bar, and wherein each of the first content navigation bar and the second content navigation bar comprise a first section marker corresponding to a first section of the digital content, a plurality of page markers corresponding to pages within the first section of the digital content wherein the plurality of page markers includes a boundary page marker, a second section marker adjacent to the boundary page marker, and a third section marker adjacent to the second section marker.

2. The electronic device of claim 1, wherein a page corresponding to a selected page marker of the plurality of page markers is rendered on the display.

3. The electronic device of claim 2, wherein the selected page marker is in visual contrast to remaining page markers of the plurality of page markers.

4. The electronic device of claim 1, wherein the first content navigation bar and the second content navigation bar are responsive to input gestures applied to the display.

5. The electronic device of claim 1, wherein the first content navigation bar is updated in response to the first selected page independent of the second content navigation bar being updated in response to the second selected page.

6. The electronic device of claim 1, wherein the electronic device comprises a first touch screen and a second touch screen, and wherein the first content navigation bar is rendered on the first touch screen and the second content navigation bar is rendered on the second touch screen.

7. The electronic device of claim 6, wherein the first content navigation bar and the second content navigation bar are identical.

8. The electronic device of claim 1, wherein a page marker of the plurality of page markers includes a page distinguishing feature.

9. The electronic device of claim 1, further comprising a thumbnail panel displaying pages of a selected section.

10. An electronic device, comprising:
a processor;
a memory for storing digital content;
a first touch screen display device; and
a second touch screen display device,
wherein the processor is to:
generate and render a first content navigation bar for navigation of the digital content on the first touch screen display device,
generate and render a second content navigation bar for navigation of the digital content on the second touch screen display device, wherein each of the first and second content navigation bars comprise section markers and page markers,
while operating in a two-page mode, generate and render a first page on the first touch screen display device and a second page on the second touch screen display device in response to selection of the first page using the first content navigation bar or in response to selection of the second page using the second content navigation bar, and
while operating in a single-page mode, generate and render the first page on the first touch screen display device in response to selection of the first page using the first content navigation bar and the second page on the second touch screen display device in response to selection of the second page using the second content navigation bar, wherein the first content navigation bar and the second content navigation bar enable independent navigation of the digital content on the first touch screen display device and the second touch screen display device, respectively, via the first content navigation bar and the second content navigation bar, respectively.

11. The electronic device of claim 10, wherein, while operating in the two-page mode, the processor is to: detect user input to cause the electronic device to enter the single-page mode, wherein the user input comprises a gesture applied to the first touch screen display device and a gesture applied to the second touch screen display device.

12. The electronic device of claim 11, wherein the gesture applied to the first touch screen display device comprises a multi-finger hold and the gesture applied to the second touch screen display device comprises at least one of a finger drag or a finger flick.

13. The electronic device of claim 11, wherein the gesture applied to the first touch screen display device is in conjunction with activation of a link contained within a portion of the digital content displayed on the first touch screen display device, the link identifying another portion of the digital content, and wherein the single-page mode further causes the another portion of the digital content to be displayed on the second touch screen display device while maintaining the portion of the digital content on the first touch screen display device.

14. The electronic device of claim 10, wherein, while operating in the single-page mode, the processor is to: detect user input to cause the electronic device to enter the two-page mode, wherein the user input comprises a gesture applied to the first touch screen display device or a gesture applied to the second touch screen display device, wherein, when the user input is the gesture applied to the first touch screen display device, the second touch screen display device is altered according to the user input and the first touch screen display device is unchanged, and wherein when the user input is the gesture applied to the second touch screen display device, the first touch screen display device is altered according to the user input and the second touch screen display device is unchanged.

15. The electronic device of claim 10, wherein, while operating in the single-page mode, the first content navigation bar is identical to the second content navigation bar.

16. The electronic device of claim 10, wherein the first content navigation bar and the second content navigation bar comprise corresponding first section markers corresponding to a first section of the digital content, and a plurality of page markers corresponding to pages within the first section of the digital content, and wherein, while operating in the two-page mode, the first content navigation bar comprises a first portion of the first section markers and a first portion of the plurality of page markers and the second content navigation bar comprises a second portion of the first section markers and a second portion of the plurality of page markers.

17. The electronic device of claim 10, wherein, while operating in the single-page mode, a selected page is held by a first gesture applied to the second touch screen display device while different designated pages are browsed by a second gesture applied to the first touch screen display device.

18. The electronic device of claim 10, further comprising a thumbnail panel displaying pages of a selected section.

19. One or more non-transitory computer readable storage media (NTCRSM) including instructions that, wherein execution of the instructions by one or more processors of a computer device is to cause the computer device to:
generate and control rendering of a first instance of a user interface, the first instance of the user interface comprising a first content navigation bar for selection of stored digital content to be displayed within a display of the computer device;
generate and control rendering of a second instance of the user interface in response to detection of a user input, the second instance of the user interface comprising the first content navigation bar rendered on a first portion of the display and a second content navigation bar rendered on a second portion of the display,
wherein the first content navigation bar is to operate independent of the second content navigation bar, and wherein each of the first content navigation bar and the second content navigation bar comprise:
section markers including a first section marker corresponding to a first section of the digital content,
a plurality of page markers corresponding to pages within the first section of the digital content, the plurality of page markers including a boundary page marker, a second section marker adjacent to the boundary page marker, and a third section marker adjacent to the second section marker;
detect a user input based on a first gesture applied to a selected page marker on the first portion of the display;
generate and control rendering of a first selected page within the first portion of the display in response to detection of the user input on the first portion of the display;
detect a user input based on a second gesture applied to a selected page marker on the second portion of the display; and
generate and control rendering of a second selected page within the second portion of the display in response to detection of the user input on the second portion of the display.

20. The one or more NTCRSM of claim 19, wherein execution of the instructions is to cause the computer device to:
control rendering of a page corresponding to a selected page marker of the plurality of page markers on the display.

21. The one or more NTCRSM of claim 19, wherein, upon selection of a first selected page marker and a second selected page marker, execution of the instructions is to cause the computer device to generate and render the first selected page marker and the second selected page marker in visual contrast to remaining page markers of the plurality of page markers.

22. The one or more NTCRSM of claim 19, wherein the first content navigation bar and the second content navigation bar are identical.

23. The one or more NTCRSM of claim 19, wherein execution of the instructions is to cause the computer device to:
generate and control rendering of another second instance of the user interface to include an updated version of the first content navigation bar in response to the first selected page independent of the second content navigation bar being updated in response to the second selected page.

* * * * *